United States Patent Office 3,660,394
Patented May 2, 1972

3,660,394
4,6-DIAMINO-1,2-DIHYDRO-ARYLOXY-
1,3,5-TRIAZINES
Patrick Mamalis, Reigate, England, assignor to Vitamins Limited, London, England
No Drawing. Original application Dec. 5, 1968, Ser. No. 781,625. Divided and this application Jan. 23, 1970, Ser. No. 8,763
Int. Cl. C07d 55/20
U.S. Cl. 260—249.9          8 Claims

ABSTRACT OF THE DISCLOSURE

Compounds of the formula:

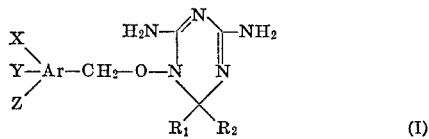

wherein:
Ar is a mono or poly nuclear aromatic ring system;
X is hydrogen or halogen;
Y is hydrogen or halogen;
Z is hydrogen or halogen;
$R_1$ is lower alkyl of 1 to 4 carbon atoms;
$R_2$ is hydrogen or lower alkyl of 1 to 4 carbon atoms or $R_1$ and $R_2$ may be linked to one another to form a spiro-cyclo-alkane moiety which includes the 2 carbon atoms of the triazine ring, or $R_1$ and $R_2$ may be linked together to form a lower alkane spiro-cyclo-alkane moiety including the 2 carbon atoms of the triazine ring, said spiro-cyclo-alkane moiety having 5 to 7 carbon atoms and said lower alkyl moiety having 1 to 4 carbon atoms,
or pharmaceutically acceptable non-toxic salts thereof have been found to be useful for their anti-malarial activity. They are administered in a general dosage range of 0.7 to 70 mg./kg. per day.

CROSS REFERENCE

This is a divisional of copending application Ser. No. 781,625, filed Dec. 5, 1968.

DETAILED DESCRIPTION

The present invention is concerned with certain novel 4,6 - diamino - 1,2 - dihydro - aryloxy - 1,3,5 - triazines. In addition, the present invention is concerned with pharmaceutical compositions containing 4,6 - diamino-1,2-dihydro-aryloxy-1,3,5 - triazines as the active ingredient, which compositions are useful for the treatment of malaria. The present invention also includes a method of treating malaria which comprises administering a 4,6-diamino - 1,2-dihydro-aryloxy-1,3,5-triazine in the general dosage range of 0.7 to 70 mg./kg. per day. Pharmaceutically acceptable non-toxic salts are also included in the present invention.

U.S. Pat. No. 2,976,288 in which I am a co-inventor discloses certain triazine derivatives which are stated to be useful as bactericides against such organisms as *Staphylococcus aureus, Streptococcus pyogenes, Corynebacterium diphtheriae, Escherichia coli, Pseudomonas aeruginosa, Ebethella typhosa* and *Klebsiella pneumoniae*. This patent also discloses methods of producing triazine derivatives, which methods are useful for producing the novel triazines of the present case and for producing the triazines used in the pharmaceutical compositions of the present case and in the methods of treatment.

My U.S. Pat. No. 3,105,074 is concerned with an improved process for the production of triazine derivatives and is useful for producing the triazine derivatives disclosed in U.S. Pat. No. 2,976,288, as well as for producing the novel triazines of my present invention, the triazines employed in my pharmaceutical compositions and used in my methods of treating malaria or preventing malaria.

In an article which I co-authored in the Journal of Medicinal Chemistry, 8,684 (1965), O-ethers of 4,6-diamino-1,2-dihydro - 1 - hydroxy - 2 - substituted 1,3,5-triazines were described and these compounds were disclosed to have antibacterial activity. The compounds were cited as inhibiting the growth of *Candida albicans* and were active against gram-positive and gram-negative bacteria.

In an article which I co-authored in the Journal of the Chemical Society, March 1965, some O-ethers of 2-substituted 4,6 - diamino-1,2-dihydro - 1 - hydroxy - 1,3,5-triazines were disclosed and a method of preparing these new O-ethers was described which comprised cyclization of the corresponding diguanides with carbonyl compounds and by O-alkylation of the corresponding 1-hydroxy-dihydro-triazines. One of the more active compounds was described as having topical antibacterial action comparable with bis-diguanide chlorhexidine and with certain bis-guanidine derivatives described at that time in other articles.

I have now made the surprising discovery that 4,6 diamino-1,2-dihydro-aryloxy-1,3,5-triazines and pharmaceutically acceptable salts thereof of the formula:

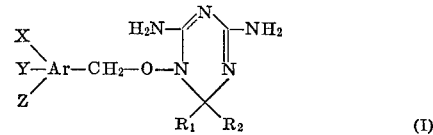

wherein:
Ar is a mono or poly nuclear aromatic ring system;
X is hydrogen or halogen;
Y is hydrogen or halogen;
Z is hydrogen or halogen, X, Y and Z being the same or different,
$R_1$ is lower alkyl or 1 to 4 carbon atoms;
$R_2$ is hydrogen or lower alkyl of 1 to 4 carbon atoms, and $R_1$ and $R_2$ may be the same or different and may be linked to form a spiro-cyclo-alkane moiety which includes the 2 carbon atoms of the triazine ring or $R_1$ and $R_2$ may be linked to form a lower alkyl spiro-cyclo-alkane moiety, the spiro-cyclo-alkane moiety having 5 to 7 carbon atoms and the lower alkane moiety thereof having 1 to 4 carbon atoms,
are effective anti-parasitic compounds.

According to my invention, administration can be by any of the normal routes of administration and the oral route is particularly advantageous.

According to the preferred embodiment of my pharmaceutical composition and method of treatment, Ar is phenyl or naphthyl, X, Y and Z are chlorine, bromine or fluorine or 1 or 2 of X and Y are hydrogen and $R_1$ and $R_2$ are each methyl. The compound 4,6-diamino-1,2 - dihydro - 2,2 - dimethyl-1-(3,4-dichlorobenzyloxy)-1,3,5-triazine, particularly in the form of the hydrochloride salt, exhibits particularly good activity against malaria.

Also a part of my present invention is the discovery of certain new triazines, which compounds exhibit good antimalarial activity. These compounds and pharmaceutically acceptable non-toxic salts thereof may be represented by the formula:

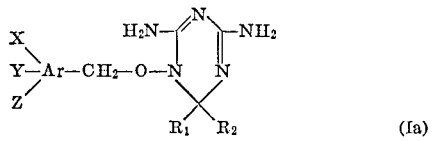

(Ia)

wherein:

Ar is phenyl or naphthyl,
X is hydrogen or halogen,
Y is hydrogen or halogen,
Z is hydrogen or halogen, X, Y and Z being the same or different,
$R_1$ is lower alkyl of 1 to 4 carbon atoms,
$R_2$ is hydrogen or lower alkyl of 1 to 4 carbon atoms, $R_1$ and $R_2$ being the same or different, or $R_1$ and $R_2$ are linked with one another to form a spiro-cyclo-alkane moiety including the 2 carbon atoms of the triazine ring, or $R_1$ and $R_2$ are linked with one another to form a lower alkyl spiro-cyclo-alkane moiety which includes the 2 carbon atoms of the triazine ring, the spiro-cyclo-alkane moiety having 5 to 7 carbon atoms and the lower alkyl moiety having 1 to 4 carbon atoms, provided that when $R_1$ is hydrogen, methyl or ethyl and $R_2$ is hydrogen, methyl or ethyl,

is not 2-chlorophenyl, 2-bromophenyl, 2-fluorophenyl, 4-chlorophenyl, 2-bromophenyl, 4-bromophenyl, 2,4-dichlorophenyl, 3,4-dichlorophenyl, 3,5-dichlorophenyl, 1-chloronaphthyl, 1-bromonaphthyl, phenyl or naphthyl and further provided that when $R_1$ and $R_2$ are —[CH$_2$]$_5$—

is not 3,4-dichlorobenzyl, 1-bromonaphthyl or naphthyl.

The salts of the present invention should, of course, be of relatively low toxicity and the non-toxic or substantially non-toxic acid addition salts are particularly suitable. The compounds are conveniently made in the form of the monohydrohalic acid addition salts, for example, the hydrobromide or the hydrochloride. Other salts may be employed in order to modify the properties of the product, such as its taste or physical properties, such as solubility and absorption. For example, the compounds may be made in the form of the picrate, saccharinate, acetate, acid maleate, acid phthalate, succinate, phosphate, p-nitrobenzoate, stearate, mandelate, N-acetyl-glycinate, pamoate, cyclohexyl sulphamate, citrate, tartrate or gluconate.

Although formulae have been used herein in order to represent the compounds of the present invention, the value of the present invention does not depend upon the precise theoretical correctness of these formulae. The names and formulae used herein are not intended to limit the invention to any specific form or to any specific optical or geometric isomer.

The compounds of the present invention may be made by reacting a diguanide of general formula:

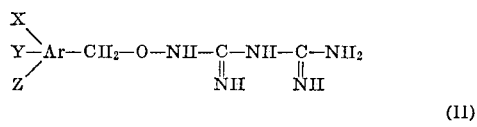

(II)

with a carbonyl compound of general formula:

(III)

in the presence of an acid, the symbols having the same meaning as in Formula I. Preferably the acid is a strong acid for example, hydrochloric or formic.

The reaction may, in some cases, be carried out without any further solvents or diluents, but usually an inert solvent, such as a lower aliphatic alcohol, e.g., methanol, is preferred. Preferably at least one molecular equivalent of acid is used.

Alternatively, the compounds of the present invention may be prepared by reacting a compound of general formula:

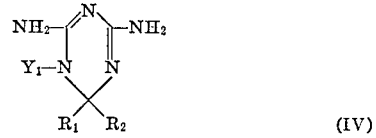

(IV)

wherein $R_1$ and $R_2$ have the meaning ascribed to them in Formula I and $Y_1$ is OH or a reactive derivative thereof, with a compound of general formula:

(V)

wherein $Y_2$ is OH or a reactive derivative thereof, for example, chlorine, bromine or iodine and the other symbols have the meanings ascribed to them in Formula I, in an inert solvent or diluent, for example, dimethylsulphoxide, dimethylformamide or ethanol.

Preferably, $Y_1$ is OH and $Y_2$ is chlorine or bromine.

The triazine derivative IV is usually obtained in the form of an acid addition salt, e.g., the hydrochloride, from which the free base may be liberated by one equivalent of base such as an alkali metal hydroxide, e.g., potassium hydroxide, or sodium in ethanol or methanol. The mixture may then be evaporated and reacted with compound V in a suitable solvent, e.g., dimethylformamide or dimethylsulphoxide. Preferably extra base is not added, since with two equivalents of sodium in alcohol, for example, a less pure product is obtained.

In a modified procedure, usually giving poorer yields, the hydrochloride of compound IV in dimethylformamide or dimethylsulphoxide is reacted with one equivalent of aqueous potassium hydroxide (using as little water as possible) and the resulting mixture treated with compound V ($Y_2$=halide) to give a triazine hydrohalide.

The novel compounds of the present invention are prepared in a similar manner.

Activity of the compounds of the present invention against malarial parasites has been detected in laboratory screens by use of the rodent malarial parasite *Plasmodium berghei* in mice. For example, using 4,6-diamino-1,2-dihydro - 2,2 - dimethyl - 1 - (3,4 - dichlorobenzyloxy)-1,3,5-triazine hydrochloride, complete protection was observed after a single subcutaneous dose of 80 mg./kg. of a suspension of the compound in oil given three days after infection. Using 40 mg./kg. there were 40–60% survivors after 60 days and using 20 mg./kg. there were 20% survivors. No acute toxicity was observed after subcutaneous doses of 640 mg./kg. The compound was also active when tested at 40 mg./kg. against strains of *P. berghei* resistant to chloroquine, p,p-diaminodiphenylsulphone and cycloguanil in mice.

The compounds were also found to protect chicks against the avian malarial parasite *Plasmodium gallinaceum*. In these experiments, 4,6-diamino-1,2-dihydro-2,2-dimethyl-1-(3,4-dichlorobenzyloxy)-1,3,5-triazine hydrochloride was compared with known antimalarials, the compound was found to be 128 times as effective as quinine.

The compound was also found to be active in vitro against the human malarial parasite *Plasmodium falciparum* and relatively active against some strains resistant to chloroquine and cycloquanil. The compound cured monkeys infected experimentally with Plasmodium cynomolgi, using oral or subcutaneous dosing schedules.

Further to these tests against Plasmodium infections, the compound was tested against certain bacteria whose growth depends on folic and folinic acids and which can, therefore, be used to detect antifolic and antifolinic acid activity. The compound was potent against *Lactobacillum casei* and *Pediococcus cerevisiae* (syn. Pseudomonas cerevisiae) being ten times more active against the former, which is an unusual difference. It is also highly active against *Streptococcus faecalis* being as active as pyrimethamine and ten times as active as cycloguanil.

Examples of other compounds within the scope of the present invention which display antimalarial activity similar to that described above are: 4,6-diamino-1,2-dihydro-2,2-dimethyl-1-(4-bromobenzyloxy)-1,3,5-triazine, 4,6-diamino-1,2-dihydro-2,2-dimethyl - 1 - (2-chlorobenzyloxy)-1,3,5-triazine, 4,6-diamino-1,2-dihydro-2,2-dimethyl-1-(1-bromo-4-naphthyl-methoxy) - 1,3,5-triazine, 4,6-diamino-1,2-dihydro-2,2-dimethyl - 1 - (2,4,5-trichlorobenzyloxy)-1,3,5-triazine.

Thus according to one aspect of the present invention, the active compounds of the invention may be employed for the treatment of malaria. They may be used in the form of the free base but preferably they would be used in the form of relatively non-toxic acid addition salts, for example, the hydrochloride. Therefore, one aspect of the invention herein claimed is a method of treatment of malaria which comprises administering one of the said compounds to the person infected or at risk. The compound may be administered orally, parenterally, or by suppository, through the oral route is preferred.

The dose of the compound needed will, of course, depend on the particular salt form used, the route of presentation and whether the compound is being used as a prophylactic, or as a therapeutic dose to give clinical or radical cure of the disease. The oral dose, expressed in terms of the hydrochloride salt, will be in the range of 5 mg. to 5 g. of the compound daily, a preferred dosage range being 5 to 600 mg. daily.

According to another aspect of the present invention, we provide pharmaceutical formulations for use in the treatment of malaria, comprising one of the compounds of the present invention, together with a pharmaceutically acceptable carrier.

As stated above, the compounds of this invention may be administered orally, parenterally or by suppository. The water solubility of the hydrochloride of the compound and most other salts is low and the hydrochloride is non-hygroscopic. If solutions are required, it will be necessary to add solubilizing agents to the water, choose non-aqueous solvents, find a more soluble salt or prepare very dilute solutions. Oral formulations are preferred and with the above proviso in connection with solutions, typical oral formulations will include tablets, pills, capsules, granules, powder, suspensions, emulsions and solutions: particularly preferred oral formulations are tablets and capsules. Where appropriate and where necessary the formulations may include diluents, binding agents, dispersing agents, surface-active agents, lubricating agents, coating materials, flavoring agents, coloring agents, solvents, thickening agents, suspending agents, sweeteners or any other pharmaceutically acceptable additives. Where the formulations are tablets or capsules and the like, they will represent pre-measured unit doses but in the case of granules, powders, suspensions and the like, the formulations may be presented as pre-measured unit doses or in multi-dose containers from which the appropriate unit dose may be withdrawn. The injectable form may be an aqueous or non-aqueous solution, suspension, or emulsion in a pharmaceutically acceptable liquid or mixture of liquids which may contain bacteriostatic agents, antioxidants or other preservatives, buffers, solutes to render the solution isotonic with the blood, thickening agents, suspending agents, or other pharmaceutically acceptable additives. Such forms will be presented in unit dose form such as ampules or disposable injection devices, or in multi-dose forms such as a bottle from which the appropriate dose may be withdrawn, or as a solid form or concentrate which can be used to quickly prepare an injectable formulation. All formulations for injection are preferably rendered sterile. Suppositories containing the compound will also contain suitable carriers.

In addition to standard pharmaceutical additives, there may be included within formulations of the compound, other therapeutic agents, particularly including other antimalarials, e.g., sulphonamides.

Insofar as the formulations are novel, this invention also provides a method of producing them.

Examples of the invention will now be described.

EXAMPLE 1

A mixture of 407.5 g. N-(3,4-dichlorobenzyloxy)diguanide, 1100 ml. methanol, 2220 ml. acetone and 254 ml. concentrated hydrochloric acid was stirred for a short time and the clear solution was allowed to stand at room temperature (about 15° C.) for three days. The triazine hydrochloride which separated was collected and washed with methanol/acetone mixture (1:2). Drying at 70° C. gave 367 g. of reasonably pure 4,6-diamino-1,2-dihydro-2,2-dimethyl-1-(3,4-dichlorobenzyloxy)-1,3,5 - triazine hydrochloride, M.P. 226° C. (uncorrected). Concentration to 300 ml., adding 300 ml. acetone and allowing to stand gave a second crop of solid (29 g.), M.P. 223–225° C. (uncorrected).

EXAMPLE 2

5.5 g. of 2,4,5-trichlorobenzyl bromide was added to a mixture of 2.8 g. benzhydroxamic acid and 0.78 g. sodium hydroxide in 40 ml. of methanol. After stirring for 1 hour and leaving overnight 2 crops of crystals were obtained, giving 3.4 g. of 2,4,5-trichlorobenzyl benzhydroxamate.

5.1 g. of this product were refluxed for 3 hours with 35 ml. methanol and 4.4 ml. concentrated hydrochloride. After the addition of ether, 3.3 g. of 2,4,5-trichlorobenzyloxyamine hydrochloride were obtained.

3.3 g. of this product were refluxed for 3 hours with 1.8 g. dicyandiamide and 35 ml. of ethanol. Most of the solvent was removed and the residue dissolved in 20 ml. water. The reaction mixture was made basic with 2 N sodium hydroxide and yielded 3.4 g. of 2,4,5-trichlorobenzyloxy diguanide.

3.5 g. of this product was stirred with 15 ml. methanol and 25 ml. acetone and 2.7 ml. of 48% hydrobromic acid for one hour. After leaving overnight, 3.3 g. of 4,6-diamino - 1,2 - dihydro-2,2-dimethyl-1-(2,4,5 - trichlorobenzyloxy)-1,3,5-triazine hydrobromide was obtained (M.P. 225° C.).

EXAMPLE 3

To 193.5 g. 4,6-diamino-1,2-dihydro-2,2-dimethyl-1-hydroxy-1,3,5-triazine hydrochloride suspended in 2 l. methanol was added a solution of 70 g. potassium hydroxide (85%) in 500 ml. methanol. The mixture was refluxed for 20–30 minutes, evaporated and the residue dried at 70–80° C. The solid was suspended in 1 l. dimethyl-formamide and stirred while adding 195.5 g. 3,4-dichlorobenzyl chloride in 50 ml. dimethylformamide over 15 minutes. After stirring at room temperature for two hours, the mixture was heated at 80–100° for 0.5 hour and cooled. Insoluble material was removed by filtration, the filtrate evaporated to dryness, and the residual semi-solid stirred with acetone and cooled at 5° to give after 24 hours a product containing some inorganic material. After washing with water and drying at 90–100°, there was obtained 250–270 g. 4,6-diamino-1,2-dihydro-2,2-dimethyl-1-(3,4-dichlorobenzyloxy) - 1,3,5 - triazine hydrochloride, M.P. 228–230° C. (uncorrected).

EXAMPLE 4

To 3.86 g. 4,6-diamino-1,2-dihydro-2,2-dimethyl-1-hydroxy-1,3,5-triazine hydrochloride suspended in 35 ml. methanol was added a solution of 1.4 g. potassium hydroxide (85%) in 10 ml. methanol. The mixture was refluxed for 20–30 minutes, evaporated and the residue dried at 70–80°. The solid was suspended in 30 ml. dimethyl-formamide and stirred while adding 5.6 g. 2,4,5-trichlorobenzyl bromide in 30 ml. dimethylformamide. After stirring at room temperature for two hours, the mixture was heated at 80–100° for 0.5 hour and cooled. Insoluble material was removed by filtration, the filtrate evaporated to dryness, and the residual semi-solid stirred with acetone and cooled at 5° to give after 24 hours a product containing some inorganic material. After washing with water and drying at 90–100°, there was obtained 4.9 g. 4,6-diamino-1,2-dihydro-2,2-dimethyl - 1 - (2,4,5-trichlorobenzyloxy) - 1,3,5 - triazine hydrobromide, M.P. 225–226° C. (uncorrected). Crystallization gave pure material M.P. 225° C.

EXAMPLE 5

Tablets containing 4,6-diamino-1,2-dihydro-2,2-dimethyl-1-(3,4-dichlorobenzyloxy) - 1,3,5-triazine hydrochloride as active ingredient One tablet contains 10 mg. of active ingredient. Dose: Two tablets to be taken three times daily for three days, i.e., 60 mg. per day. Then one tablet to be taken twice daily, i.e., 20 mg. per day, N.B. The tablet is compressed with embossed punches to produce a breakline, this would allow half doses when required (5 mg.).

Formulation for production of 100,000
tablets (approximately 15 kg.):                 Grams
  Active ingredient _____  1,000
  Maize starch (6–9% moisture limit) _____  1,500
  Gum. acacia powder _____     500
  Lactose _____  8,000
  Icing sugar _____  4,500
  Talc _____    200
  Magnesium stearate _____    100
  Liquid paraffin _____     15
  Water, approx. 1 liter.
  N.B. theoretical yield, 100,000 tablets.

Method
(1) Granulation:

(1) Dry starch in a hot air oven at 40° C. until moisture is reduced to limit of 6–9% w./w.
(2) Sieve each of the powders separately through a 40 mesh sieve.
(3) Place the active ingredient in a planetary mixer and gradually add the lactose with continual stirring.
(4) Add the icing sugar, starch and acacia, mixing for about five minutes after each addition, continue to mix for a further twenty minutes.

(5) With constant mixing, add sufficient water until a suitable granule consistency is obtained (approximately 1 liter).
(6) Pass damp granules through a rotary granulator fitted with a 10 mesh screen.
(7) Dry the granules on trays at approximately 50° C.

(2) Compression mixture:

(1) Pass the dried granules through a 16 mesh screen.
(2) Sieve sufficient dried granules on a 40 mesh sieve to obtain approximately 500 grams of fines.
(3) Mix the liquid paraffin with the fines and pass through a 20 mesh sieve.
(4) Pass the talc and magnesium stearate through a 20 mesh sieve.
(5) To the bulk of the granules in a planetary mixer add the lubricated fines, followed by the talc and magnesium stearate. Mix thoroughly for at least ten minutes after each addition, and finally for twenty minutes.

(3) Tabletting: Compress the tablets on a rotary machine using specified punches and limits of thickness. Check weight of tablets (10 tablets weigh 1.5 grams). Tablets can be spray coated with specified film coating lacquer.

EXAMPLE 6

A 200 mg. tablet containing 25 mg. of 4,6-diamino-1,2-dihydro - 2,2 - dimethyl - 1 - (3,4-dichlorobenzyloxy)-1,3,5-triazine hydrochloride was prepared by dispersing sufficient of the compound in a dry mixture containing dicalcium phosphate (89%) starch (7.5%) magnesium or calcium stearate (1.0%) and microcrystalline cellulose (2.5%). Compression provided a tablet which disintegrated very rapidly in water, i.e., in about 30 seconds.

EXAMPLE 7

A tablet of the following composition was prepared:

|  | Mg. |
|---|---|
| 4,6-diamino-1,2-dihydro-2,2-dimethyl - 1 - (3,4-dichlorobenzyloxy)-1,3,5-triazine | 25.0 |
| Spray dried lactose | 151.0 |
| Pregelatinized starch | 15.0 |
| Maize starch | 7.5 |
| Magnesium stearate | 1.5 |
| Tablet weight | 200.0 |

This tablet was prepared by normal compression procedures following a wet granulation process using the customary pharmaceutical techniques. The disintegration time in water was within the normal range not exceeding fifteen minutes.

EXAMPLE 8

Formulations suitable for intramuscular injection were made by dissolving 4,6-diamino-1,2-dihydro-2,2-dimethyl-1-(3,4-dichlorobenzyloxy)-1,3,5-triazine hydrochloride in an acceptable pharmaceutical carrier as follows:

(a) 0.5 gram of active ingredient were dissolved in a mixture of 95 ml. propylene glycol and 5 ml. of benzyl alcohol.
(b) 0.5 gram of active ingredients were dissolved in a mixture of 47.5 ml. propylene glycol 5 ml. benzyl alcohol and 47.5 ml. water.

Both formulations were made up into 2 ml. ampules containing 10 mg. of active substance.

EXAMPLES 9–25

The following compounds were made by methods similar to those described in Examples 1 to 4. They display activity against malaria and were incorporated into pharmaceutical formulations by methods similar to those described in Examples 5 and 6.

| Example No. | X | Y | Z | Ar | $R_1$ | $R_2$ | Salt |
|---|---|---|---|---|---|---|---|
| 9 | 4-Br | H | H | Phenyl | $CH_3$ | $CH_3$ | HCl. |
| 10 | 2-Cl | H | H | ___do___ | $CH_3$ | $CH_3$ | HBr. |
| 11 | 1-Br | H | H | 4-naphthyl | $CH_3$ | $CH_3$ | HCl. |
| 12 | 1-Br | H | H | 2-naphthyl | $CH_3$ | $CH_3$ | HCl. |
| 13 | 1-Cl | H | H | ___do___ | $CH_3$ | $CH_3$ | HCl. |
| 14 | 3-Cl | 4-Cl | H | Phenyl | $(CH_2)_5$[a] | | HCl. |
| 15 | 3-Cl | 5-Cl | H | ___do___ | $CH_3$ | $CH_3$ | HCl. |
| 16 | 3-Cl | 4-Cl | H | ___do___ | $C_2H_5$ | H | HCl. |
| 17 | 2-Cl | 4-Cl | H | ___do___ | $C_2H_5$ | H | HBr. |
| 18 | 2-Cl | 4-Cl | 5-Cl | ___do___ | $CH_3$ | $CH_3$ | HBr. |
| 19 | 2-Cl | 3-Cl | H | ___do___ | $CH_3$ | $CH_3$ | HCl. |
| 20 | 2-Cl | 6-Cl | H | ___do___ | $CH_3$ | $CH_3$ | HBr. |
| 21 | 2-Br | H | H | ___do___ | $CH_3$ | $CH_3$ | HBr. |
| 22 | 2-F | H | H | ___do___ | $CH_3$ | $CH_3$ | HBr. |
| 23 | 3-Cl | H | H | ___do___ | $CH_3$ | $CH_3$ | HBr. |
| 24 | 3-Cl | 4-Cl | H | ___do___ | $CH_3$ | $CH_3$ | Saccharinate. |
| 25 | H | H | H | ___do___ | $CH_3$ | $CH_3$ | HCl. |

[a] To form cyclohexyl.

What is claimed is:
1. A compound selected from the group consisting of a dihydrotriazine of the formula:

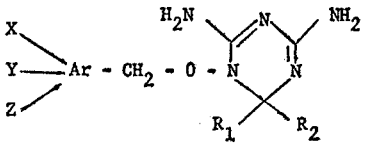

wherein:
X is 2-chloro,
Y is chloro,
Z is hydrogen or chloro,
Ar is phenyl,
$R_1$ is lower alkyl of 1 to 4 carbon atoms,
$R_2$ is hydrogen or lower alkyl of 1 to 4 carbon atoms, or $R_1$ and $R_2$ together with the carbon atom of the triazine ring to which they are attached form a spirocyclo-alkane moiety of 5 to 7 carbon atoms, provided that when $R_1$ and $R_2$ are methyl and Z is hydrogen, Y is not 4-chloro, and a pharmaceutically acceptable non-toxic acid addition salt thereof.

2. A compound according to claim 1 wherein X, Y and Z are each chloro.

3. A compound according to claim 1 wherein:

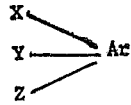

is 2,3-, 2,5- or 2,6-dichlorophenyl.

4. A compound selected from the group consisting of 4,6-diamino-1,2-dihydro-2,2-dimethyl - 1 - (trichlorobenzyloxy)-1,3,5-triazine and a pharmaceutically acceptable non-toxic acid addition salt thereof.

5. A compound selected from the group consisting of 4,6-diamino-1,2-dihydro-2,2-dimethyl - 1 - (2,4,5-trichlorobenzyloxy)-1,3,5-triazine and a pharmaceutically acceptable non-toxic acid addition salt thereof.

6. A compound selected from the group consisting of 4,6-diamino-1,2-dihydro-2,2-dimethyl - 1 - (2,3-dichlorobenzyloxy)-1,3,5-triazine and a pharmaceutically acceptable non-toxic acid addition salt thereof.

7. A compound selected from the group consisting of 4,6-diamino-1,2-dihydro-2,2-dimethyl - 1 - (2,6-dichlorobenzyloxy)-1,3,5-triazine and a pharmaceutically acceptable non-toxic acid addition salt thereof.

8. A compound selected from the group consisting of 4,6-diamino-1,2-dihydro - 2 - ethyl-1-(2,4-dichlorobenzyloxy)1,3,5-triazine and a pharmaceutically acceptable non-toxic acid addition salt thereof.

References Cited
UNITED STATES PATENTS 2,976,288  3/1961  Green et al. _____ 260—249.9
3,105,074  9/1963  Mamalis _____ 260—249.9

OTHER REFERENCES

Mamalis et al., J. Chem. Soc., pp. 3915–26 (1962).
Mamalis et al., J. Chem. Soc., pp. 1829–43 (1965).
Mamalis et al., J. Med. Chem., pp. 684–91 (1965).

JOHN M. FORD, Primary Examiner

U.S. Cl. X.R.
424—249